United States Patent
Pruitt et al.

(10) Patent No.: US 6,597,907 B1
(45) Date of Patent: Jul. 22, 2003

(54) DETECTION OF A DEADLOCKED RESOURCE CONDITION IN A POOL OF SHARED RESOURCES

(75) Inventors: Leonard Pruitt, The Colony, TX (US); Loudon Lee Campbell, Plano, TX (US); Mustafa Kocaturk, Dallas, TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/565,329

(22) Filed: May 5, 2000

(51) Int. Cl.[7] .............................................. H04B 17/00
(52) U.S. Cl. ........................ 455/423; 455/424; 455/450; 455/509
(58) Field of Search ............................. 455/9, 423, 424, 455/67.1, 8, 450, 452, 509; 370/236, 414, 94.1

(56) References Cited

U.S. PATENT DOCUMENTS

| | | | | |
|---|---|---|---|---|
| 5,479,407 A | * | 12/1995 | Ko et al. | 370/231 |
| 5,859,981 A | * | 1/1999 | Levin et al. | 709/238 |
| 6,023,706 A | * | 2/2000 | Schmuck et al. | 707/200 |
| 6,381,682 B2 | * | 4/2002 | Noel et al. | 711/153 |
| 2002/0052914 A1 | * | 5/2002 | Zalewski et al. | 709/203 |
| 2002/0089933 A1 | * | 7/2002 | Giroux et al. | 370/236 |

* cited by examiner

Primary Examiner—Thanh Cong Le
Assistant Examiner—Tan Trinh
(74) Attorney, Agent, or Firm—Jenkens & Gilchrist, P.C.

(57) ABSTRACT

A deadlocked resource condition in a pool of shared resources is detected by measuring a characteristic of resource utilization over a predefined time interval and comparing the measured characteristic in accordance with a predicted statistical relationship. If the measured resource utilization is inconsistent with the predicted statistical relationship, a deadlocked resource condition is determined to have occurred.

43 Claims, 6 Drawing Sheets

DETECTION OF A DEADLOCKED RESOURCE CONDITION IN A POOL OF SHARED RESOURCES

BACKGROUND OF THE INVENTION

1. Technical Field of the Invention

The present invention relates in general to the field of network systems, and in particular, by way of example, and not limitation, to detection of a deadlocked resource condition in a pool of shared resources.

2. Description of Related Art

In a typical network system, such as a telecommunication system or data network system, the network maintains centralized control over available resources, and allocates these resources to individual devices or processes in response to a resource request. This centralized control enables the network to share the available resources among a larger number of users, thereby allowing network operators to offer a greater level of service at a lower cost. The sharing of resources among potentially competing devices or processes, however, causes network systems to be susceptible to resource conflict. This problem arises when two or more devices or processes attempt to access the same resource during the same time interval. These potentially conflicting uses of shared resources require the network system to maintain an established protocol that enables either the network or individual devices or processes to determine when access to a given resource is permissible.

Resource locking is one technique commonly employed in network systems to avoid resource conflicts. This technique utilizes a protocol in which the network signals the use of a resource by marking the resource as "used" or "busy." This notifies the network and/or competing processes that the resource cannot be accessed at that time. In operation, a process desiring access to a particular resource inspects the lock or flag associated with that particular resource before submitting a resource request. Alternatively, the network inspects the flag associated with the resource before allocating the resource to the particular process. If the flag indicates that the resource is currently "free" or "idle," the process is allocated the resource, uses the resource, and then releases the resource when the process is finished. On the other hand, if the flag indicates that the resource is "used" or "busy," the process and/or network waits for the resource to be released by the prior acquiring process before allowing access to the resource.

If the network system configures the available resources into one or more pools of similar or identical resources, the resource locking technique may employ a "seizure" mechanism that attempts to seize a free (available) instance of a resource from the resource pool and allocate the seized resource to the requesting device or process. This seizure mechanism typically utilizes a search strategy or a linked list approach to identify free instances of the requested type of resource. If a search strategy is used, for example, the pool of the appropriate type of resource is examined in a specified order until a free resource is found and seized or the search is abandoned because it is determined that there are no free resources within the resource pool. If the linked-list approach is used, on the other hand, the first item of the linked-list (if there is an item in the linked-list) represents an available instance of the resource. This resource may then be seized by the seizure mechanism by changing the state of the found resource from idle to busy. Regardless of the type of seizure approach used, the end result will be either identification of an available resource within the resource pool or a report back to the device or process originally requesting the resource that "congestion" has occurred and, thus, no free resources of the type requested are currently available. If an instance of the resource is found and seized by the seizure mechanism, the seized resource is effectively locked or otherwise prevented from being seized again until the seized resource is freed by the reverse of the seizure mechanism.

One undesirable situation that can arise in a resource locking scheme is a "deadlocked resource condition." For the purposes of the present invention, a deadlocked resource condition occurs when a device or process that has been allocated a shared resource fails to release the resource for illegitimate reasons, such as an error in communications, an error in system or application software, or an undesired operational state. For example, an error in the system or application software may cause the process or network to fail to release the resource when the process is complete, or the signal releasing the shared resource may not be received due to an error in communications. Moreover, the process to which the resource is allocated may encounter an unexpected error and self-terminate, or the process may be terminated ("killed") by the operating system or another process without releasing the resource. This situation is referred to as process death, and may cause the shared resource to remain locked by the dead process potentially forever.

A deadlocked resource condition may also occur due to conventional deadlock between competing processes. This conventional deadlock situation arises when a first process attempts to acquire a resource that is already locked by a second process, and the second process likewise attempts to acquire a resource that is already locked by the first process. Since neither process is able to release the lock sought by the other, neither process cane proceed. Both resources will remain locked until one of the conventionally deadlocked processes is terminated to allow the other process to continue.

If a deadlocked resource condition is not detected and corrected, and if the process or processes continue to cause deadlocked resource conditions due to a reoccurring error or reoccurring operational state, all available resources will be gradually consumed. This situation leads to a gradual degradation in the quality of service offered by the network, until the network eventually ceases to function. Therefore, in a network system which employs a resource locking scheme, there must be a mechanism for detecting a deadlocked resource condition in time for network operators or system software to take corrective action, such as temporarily assigning additional resources to allow the network some ability to function, restarting the network to clear deadlocked resource conditions, and actually fixing the problem causing the deadlocked resource condition.

Existing approaches have attempted to alleviate the problems described above by utilizing either a timer-based or logic-based solution or by monitoring traffic congestion. In a timer-based solution, a separate timer is initiated for each resource allocation. If the resource remains locked after a predetermined amount of time has expired, the network assumes that a deadlocked resource condition has occurred, terminates the process, and releases the resource. Although a timer-based solution has the potential to correctly detect deadlocked resource conditions in situations involving a definite upper time limit of resource usage, this solution proves to be inadequate in situations where the upper time limit is relatively long or indefinite. For example, because users will only (normally) tolerate a call setup that is measured in seconds and is well under a minute in maximum duration, the timer-based solution may perform well in situations where the resources are allocated for call setup only and are not used once the call has been completely established. The call itself, however, can last indefinitely, and multi-day long calls are not impossible. Thus, in order to avoid disconnecting a valid, but relatively long, call, a deadlock detection timer must be configured with a time interval that is so long as to be impractical for early detection of deadlock resource conditions. If deadlocked resource conditions were to start occurring frequently, the whole pool of resources may be consumed before the first timer expires. Furthermore, at least one timer must be separately maintained for each seized resource, thus adding to the cost of implementation, maintenance, and the cost of processor time per call.

A logic-based solution, on the other hand, detects conventional deadlock among competing processes by monitoring resources allocated to and requested by each process. Conventional deadlock is detected if a cyclical pattern exists among competing processes. For example, if process A is allocated a first resource and requests a second resource, and process B is allocated the second resource and requests the first resource, the solution will detect the occurrence of conventional deadlock. This logic-based solution, however, is not only complex and difficult to implement in practice, but also fails to detect other causes of a deadlocked resource condition, such as errors in system or application software and errors in communication.

Finally, an approach that monitors traffic congestion initiates an alarm signal when all available resources are utilized. This approach not only fails to warn network operators or system software of a deadlocked resource condition in time to take corrective action, but also fails to resolve the problems mentioned above due to the inability distinguish between a true deadlocked resource condition and a temporarily high traffic load.

Therefore, in light of the deficiencies of existing approaches, there is a need for a detection mechanism that can detect a deadlocked resource condition in a pool of shared resources and that can be easily implemented within existing network systems in a cost effective manner.

SUMMARY OF THE INVENTION

The deficiencies of the prior art are overcome by the method and system of the present invention. For example, as heretofore unrecognized, it would be beneficial to exploit known or predictable statistical properties of traffic-based resource utilization to detect a deadlocked resource condition in a pool of shared resources by utilizing known or predictable statistical relationship(s). In fact, it would be beneficial to periodically measure resource utilization over a predefined time interval and compare the measured resource utilization to a predicted resource utilization. A deadlocked resource condition is then determined to have occurred if the measured resource utilization is inconsistent with the predicted resource utilization at a predefined confidence level.

In a first embodiment of the present invention, samples of resource utilization are periodically measured over a predefined time interval to determine a mean resource utilization and a variance of the resource utilization. The determined mean and the determined variance are then compared in accordance with a known or predictable statistical relationship. For example, assuming resource utilization (e.g. offer traffic) of the network approximates a Poisson distribution, the measured variance is compared to k times the measured mean (where k may vary between zero and one depending on the degree of closeness to a Poisson model) If the determined variance is less than k times the determined mean, then a deadlocked resource condition is determined to exist. Conversely, if the determined variance is greater than k times the determined mean, then a deadlocked resource condition is determined not to exist.

In a second embodiment of the present invention, samples of resource utilization are periodically measured over a predefined time interval. The measured samples are then compared to a threshold minimum which comprises, for example, a predetermined value, a fraction of the average of the is measured samples, a fraction of the maximum of the measured samples, or a fraction of the historical average resource utilization. If no measured samples fall below the threshold minimum during the predefined time interval, a deadlocked resource condition is determined to exist.

A third embodiment of the present invention detects a deadlocked resource condition in a resource experiencing an increased traffic load by exploiting the fact that deadlocked resource conditions do not contribute to the variance of the resource utilization. This third embodiment periodically measures resource utilization over a predefined time interval and determines a trend line of the measured resource utilization. This trend line is determined, for example, by performing linear regression analysis or by maintaining a running average over the predefined time interval. If the trend line is positively inclined (indicating an increased traffic load and/or increased deadlocked resource conditions) and there is no increase in the standard error of the samples beyond a predetermined limit, then a deadlocked resource condition is determined to exist.

In a fourth embodiment of the present invention, resource utilization for multiple pools of resources are periodically measured over a predefined time interval. If traffic is increasing within the network, then there will tend to be a corresponding increase in utilization for a set of positively correlated resource pools. The patterns of correlation between resource pools can be determined by experience. If a particular resource pool demonstrates an upward trend in resource utilization during the predefined time interval, the trend is compared with the set of resource pools against which the particular resource pool has historically been shown to be correlated. If the trend of the particular resource pool is greater than the average trend of the set of resource pools, then a deadlocked resource condition is determined to exist.

The technical advantages of the present invention include, but are not limited to, the following exemplary technical advantages. It should be understood that particular embodiments may not involve any, much less all, of the following exemplary technical advantages.

An important technical advantage of the present invention is that it enables network operators or system application software to detect deadlocked resource conditions and thereby take corrective action.

Another important technical advantage of the present invention is the ability to exploit known or predictable statistical properties of traffic-based resource utilization to advantageously detect deadlocked resource conditions in a pool of shared resources.

Yet another important technical advantage of the present invention is that it is both logically simpler and more generally applicable to a wide variety of network systems and network applications than existing approaches.

Yet still another important technical advantage of the present invention is that it can be easily implemented within existing network systems in a cost effective manner.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method and system of the present invention may be had by reference to the following detailed description when taken in conjunction with the accompanying drawings wherein.

DETAILED DESCRIPTION OF THE DRAWINGS

In the following description, for purposes of explanation and not limitation, specific details are set forth, such as particular circuits, logic modules (implemented in, for example, software, hardware, firmware, etc.), techniques, etc. in order to provide a thorough understanding of the invention. However, it will be apparent to one of ordinary skill in the art that the present invention may be practiced in other embodiments that depart from these specific details. In other instances, detailed descriptions of well-known methods, devices, logical code (hardware, software, firmware, etc.), etc. are omitted so as not to obscure the description of the present invention with unnecessary detail.

Furthermore, it should be emphasized that although the following description describes certain aspects of the present invention in the context of memory leak within a wireless communication system, the practice of the present invention is not limited to such applications or systems. Rather, it will be apparent to one of ordinary skill in the art that the teachings of the present invention are equally applicable to detection of a deadlocked resource condition in network systems in general. For example, the principles of the present invention may be advantageously practiced in network communication systems and data network systems, as well as to other computer systems or individual computing devices in which shared resources, such as memory, databases, printers, communication links, buses, internal or external hardware devices, software applications and the like, are susceptible to a deadlocked resource condition. Therefore, the wireless communication system embodiment described herein is provided for the purpose of explanation, and not limitation.

Figure 1:
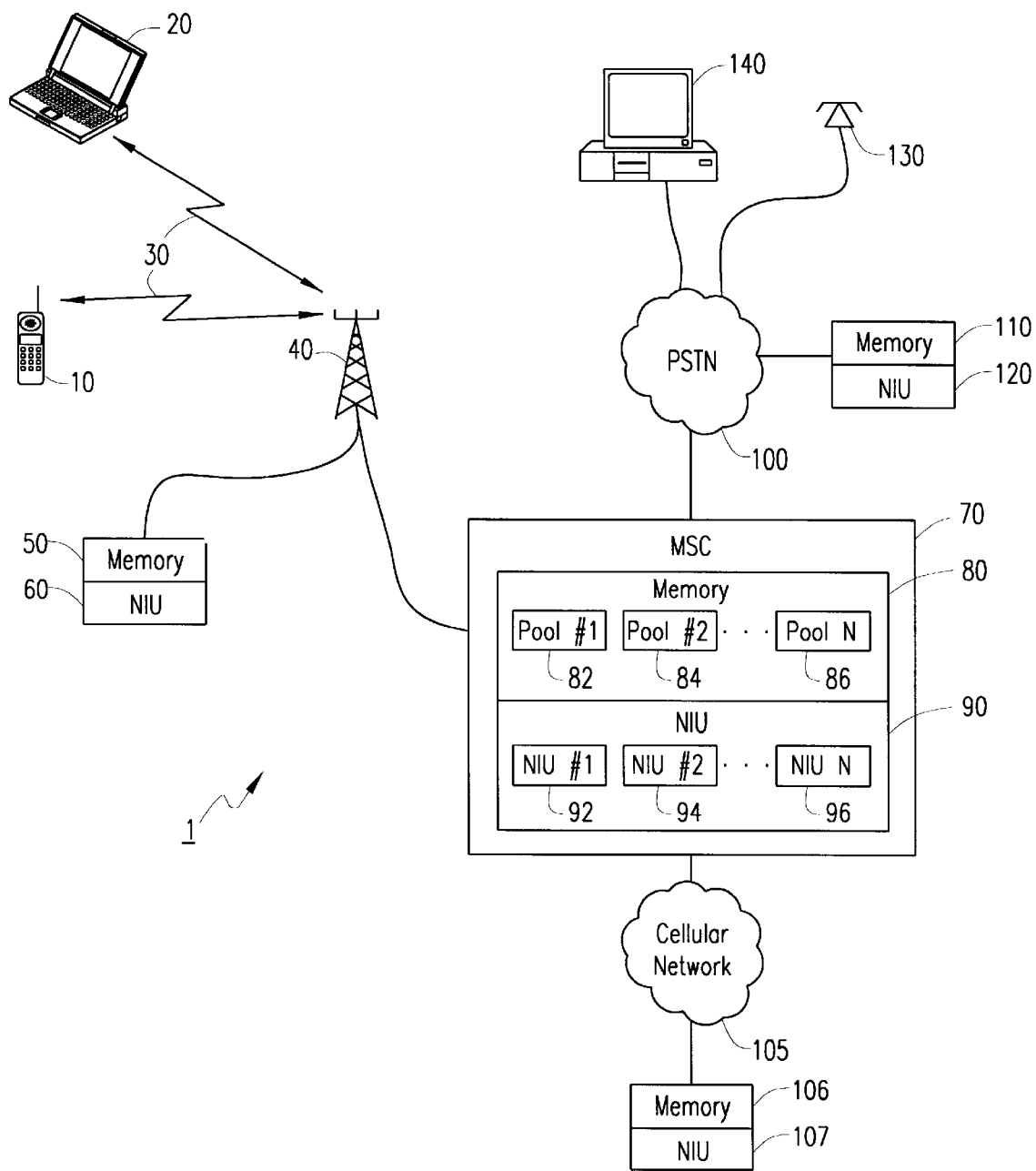
FIG. 1 illustrates a portion of an exemplary wireless system with which the present invention may be advantageously practiced.

A preferred embodiment of the present invention and its advantages are best understood by referring to FIGS. 1–6 of the drawings, like numerals being used for like and corresponding parts of the various drawings. Referring to FIG. 1, a portion of an exemplary wireless system with which the present invention may be advantageously practiced is depicted generally at 1. In this exemplary wireless system, a mobile station 10 communicates with a base station 40 over an air interface 30. A data terminal 20, such as a portable computer, may also communicate with the base station 40 over the same air interface 30 via for example, a cellular modem. A mobile switching center 70 is connected to the base station 40 and enables the mobile station 10 and the data terminal 20 to communicate with wireless devices within the cellular network 105 and with wireline devices connected to the Public Switched Telephone Network (PSTN) 100. The mobile switching center 70, the base station 40 and other devices within the cellular network 105 and PSTN each include one or more processors and program memory units that control the functionalities of the associated device and that may be configured to operate in accordance with the present invention as described hereinbelow.

The exemplary wireless communication system of FIG. 1 also includes shared memory units 50, 80, 106 and 110 associated with the base station 40, the mobile switching center 70, the cellular network 105 and the PSTN 100, respectively. Each of the shared memory units 50, 80, 106 and 110 may be divided into a number of discrete units or blocks of memory, thereby providing a pool of shared memory resources that may be allocated to requesting devices or processes. Alternatively, one or more of the shared memory units may be divided into a number of resource pools that are further divided into discrete units or blocks of memory. For example, the mobile switching center 70 may divide its shared memory unit 80 into five hundred or more resource pools 80, 82 and 86, where each resource pool represents the memory, files, records, etc. that may be allocated by a corresponding program module or functionality of the mobile switching center 70. It should be understood that although the following discussion describes certain aspects of the present invention with reference to shared memory units 50, 80, 106 and 110 and corresponding number in use (NIU) counters 60, 90, 107 and 120, the principles of the present invention are equally applicable to resource pools 82, 84 and 86 and corresponding resource pool NIU counters 92, 94 and 96.

Referring again to FIG. 1, as a call is processed from an originating party to a terminating party, memory within the shared memory units 50, 80, 106 and 110 are allocated to devices or processes associated with the particular call. For example, if the mobile station 10 initiates a call to a wireline telephone 130, the communicating base station 40 allocates to the mobile station 10 memory from its associated shared memory unit 50. The base station 40 then forwards the call to the mobile switching center 70, which performs further processing and allocates to the particular call memory from its associated shared memory unit 80. Other devices along the transmission path from the mobile station 10 to the wireline telephone 130 similarly allocate shared memory to the particular call until the call is ultimately terminated at the wireline telephone 130. The allocated memory along the transmission path is typically marked or flagged by the associated devices as "used" or "busy" to indicate that the allocated memory cannot be accessed by other devices or processes.

When one of the parties hangs up, the memory allocated at each of the respective shared memory units 50, 80 and 110 along the transmission path is released by a call tear-down procedure. Once the memory is released, the memory is marked as "free" or "idle" to indicate that the memory may be reallocated to other devices or processes. A problem arises, however, when the allocated memory is not released after the call is ended. This problem may be caused, for example, by an error in communications, an error in system or application software, an abnormal termination of the call, or an undesired operational state. Because the memory previously allocated to the call is still marked as used, this memory cannot be reallocated and remains "locked", potentially forever. This problem is further compounded by the fact that an error at one point along the transmission path may cause the error to be propagated to additional points along the transmission path, resulting in locked memory at multiple shared memory units. If the locked memory is not detected, and if the error causing the locked memory continues to occur, the available memory at one or more of the shared memory units 50, 80, 106 and 110 will be gradually consumed. This is referred to as "memory leak", and, for the purposes of the present invention, represents one case of a deadlocked resource condition.

One aspect of the present invention detects the presence of memory leak by periodically measuring memory utilization at one or more of the shared memory units 50, 80, 106 and 110. This periodic measurement may be accomplished, for example, by periodically polling a number in use (NIU) counter 60, 90, 107, 120 associated with each shared memory unit 50, 80, 106, 110, respectively. The respective NIU counters keep track of the number of records within the associated shared memory unit that are currently being used by devices or processes. Alternatively, memory utilization may be measured by periodically measuring the amount of used memory or the percentage of the concerned memory or device pool that is currently allocated. The measured memory utilization is then compared to a predicted memory utilization, and memory leak is determined to have occurred if the measured memory utilization is inconsistent with the predicted memory utilization at a predefined confidence level.

In a first embodiment of the present invention, memory utilization is periodically measured over a predefined time interval. It should be noted that the sampling period used to measure the memory utilization should be sufficiently large so that the measured samples are relatively independent. Preferably, the sampling period is chosen to be greater than mean holding time, e.g., greater than the average length of a call. Alternatively, the sampling period is chosen to be a predetermined length, such as one hour. The mean utilization and the variance of the utilization over the predefined time interval are then determined from the measured samples. The determined mean and determined variance are then compared in accordance with a known or predictable relationship. A deadlocked resource condition is determined to exist if the determined mean and the determined variance are inconsistent with the predicted relationship at a predefined confidence level.

This aspect of the first embodiment exploits the fact that memory utilization typically follows a predictable pattern or distribution. For example, in traffic-based systems, memory utilization will typically follow either a Poisson distribution or a Binomial distribution. As will be discussed in further detail below, these distributions have predictable relationship(s) between the mean and variance. Accordingly, if memory leak has occurred at a shared memory unit, the mean utilization and the variance of the utilization will be inconsistent with these predicted relationship(s). This inconsistency is caused by the fact that memory leak contributes to the mean utilization, but not the variance of the utilization.

Assuming memory utilization within the system approximates a Poisson distribution, the mean utilization approximates the variance of the utilization. Accordingly, memory leak is detected by comparing the determined variance of the utilization to k times the determined mean utilization, where the value of k is between zero and one depending on the degree of closeness to a Poisson model. Optionally, the value of k is varied or adjusted to increase or decrease the sensitivity of memory leak detection. If the determined variance is less than k times the determined mean, then memory leak is determined to exist. Conversely, if the determined variance is greater than k times the determined mean utilization, then memory leak is determined not to exist.

Figure 2A:
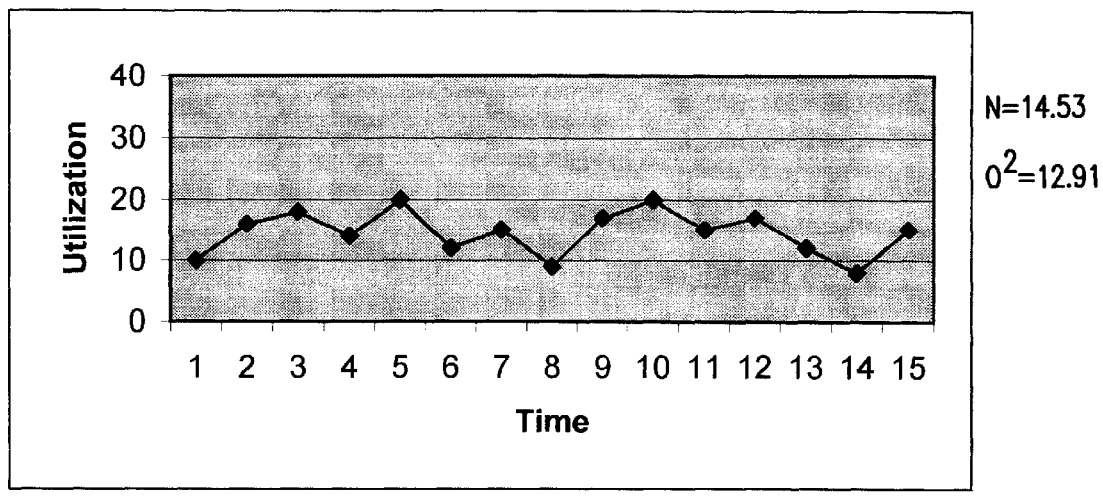
FIG. 2A illustrates an exemplary graph of memory utilization over a time interval in which memory leak is determined not to exist in accordance with a first embodiment of the present invention.

Referring to FIG. 2A, an exemplary graph of memory utilization over a time interval in which memory leak is determined not to exist in accordance with the first embodiment of the present invention is illustrated. In this example, memory utilization is periodically measured over a specified time interval. Again, the sampling period should be sufficiently large so that the samples are relatively independent. Furthermore, it should be understood that the number of samples taken in this example is for explanatory purposes, and may be greater or fewer than fifteen. Preferably, there should be a sufficient number of samples to provide an approximate distribution or minimize the effects of unusual occurrences. However, the number of samples does not need to be so large that it satisfies the central limit theorem. Based on the measured utilization in this example, the mean utilization ($\mu$) is determined to be 14.53, and the variance of the utilization ($\sigma^2$) is determined to be 12.91. Assuming that memory utilization follows a Poisson distribution and that k is be equal to 0.8 based, for example, on experience or an estimate from historical memory utilization patterns, the relationship between the mean utilization and the variance of the utilization satisfy the following relationship:

Variance>*k*\*mean 12.91>0.8\*14.53

12.91>11.62

Because the variance of the utilization is greater than k times the mean utilization, this relationship indicates that memory leak has not occurred.

Figure 2B:
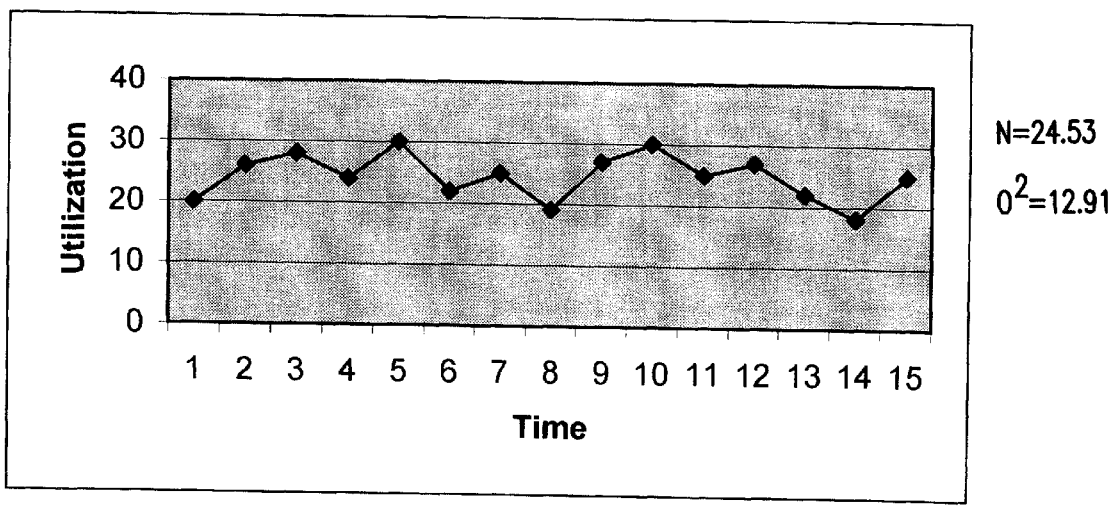
FIG. 2B illustrates an exemplary graph of memory utilization over a time interval in which memory leak is determined to exist in accordance with the first embodiment of the present invention.

Referring to FIG. 2B, an exemplary graph of memory utilization over a time interval in which memory leak is determined to exist in accordance with the first embodiment of the present invention is illustrated. Based on the memory utilization data in this example, the mean utilization ($\mu$) is determined to be 24.53, and the variance of the utilization is determined to be 12.91. Again, assuming that the memory utilization approximates a Poisson distribution and that k is equal to 0.8, the mean utilization and the variance of the utilization satisfy the following relationship:

Variance<*k*\*mean 12.91<0.8\*24.53

12.91<19.62

Because the variance of the utilization in this case is less than the mean utilization, this relationship indicates that memory leak has occurred.

It should be emphasized that the practice of the first embodiment is not limited to memory utilization that approximates a Poisson distribution. Rather, the principles of the first embodiment are equally applicable to other types of distributions. For example, if the memory utilization approximates a Binomial distribution, the mean utilization is proportional to the variance of the utilization, and therefore, the ratio of the mean and the variance approximates a constant value. Specifically, the ratio of the mean and the variance approximates 1/1−p, where p is the probability that a particular file, record or memory cell of the shared memory unit is in use. If the ratio of the mean and the variance fails to fall below the predicted constant value for an extended period of time (e.g. for the duration of the predefined time interval), then memory leak is determined to have occurred. The following table illustrates the relationship(s) between the mean and variance for some exemplary distributions.

| Distribution | Parameter Space | Mean ($\mu$) | Variance ($\sigma^2$) | Relationship |
|---|---|---|---|---|
| Bernoilli | $0 \leq p \leq 1$<br>n = 1, 2, 3, ... | p | p(1 − p) | $\frac{\mu}{\sigma^2} \cong \frac{1}{1-p}$ |
| Binomial | $0 \leq p \leq 1$<br>n = 1, 2, 3, ... | np | np(1 − p) | $\frac{\mu}{\sigma^2} \cong \frac{1}{1-p}$ |
| Geometric | $0 \leq p \leq 1$ | $\frac{1-p}{p}$ | $\frac{1-p}{p^2}$ | $\frac{\mu}{\sigma^2} \cong p$ |
| Poisson | $\lambda > 0$ | $\lambda$ | $\lambda$ | $\mu \cong \sigma^2$ |

In a second embodiment of the present invention, samples of memory utilization are periodically collected over a predefined time interval. Again, these samples are collected by, for example, periodically polling the NIU counter associated with a particular shared memory unit, or by periodically measuring the amount of used memory or the percentage of total memory that is currently in use. Furthermore, the sampling period and the time interval should be sufficiently large to ensure the samples are relatively independent and provide a fair approximation of the actual memory utilization. The measured samples are then compared to a threshold minimum which comprises, for example, a predetermined value, a fraction of the average of the measured samples, or a fraction of the maximum of the measured samples. Alternatively, the threshold minimum comprises a fraction of the historical average memory utilization. If no measured samples fall below the threshold minimum during the predefined time interval, memory leak is determined have occurred.

Figure 3A:
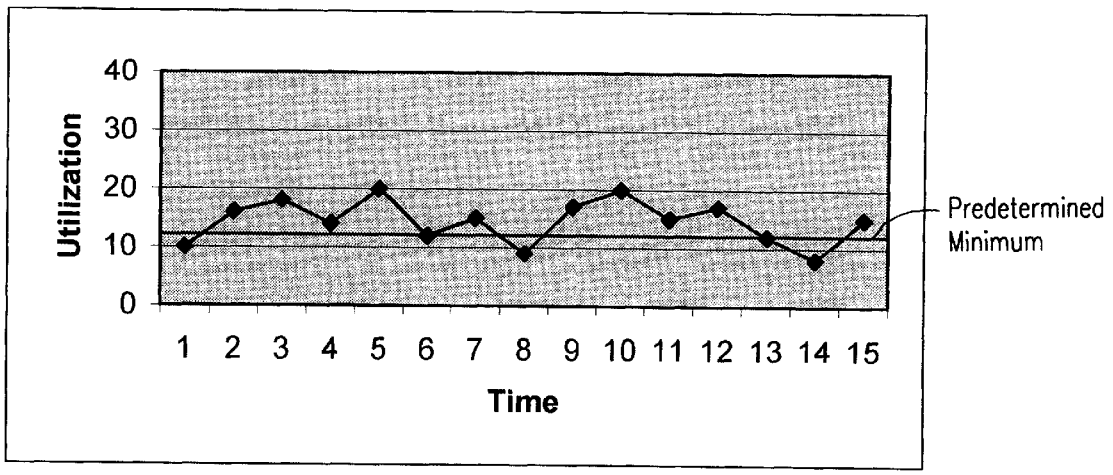
FIG. 3A illustrates an exemplary graph of memory utilization over a time interval in which memory leak is determined not to exist in accordance with a second embodiment of the present invention.
Figure 3B:
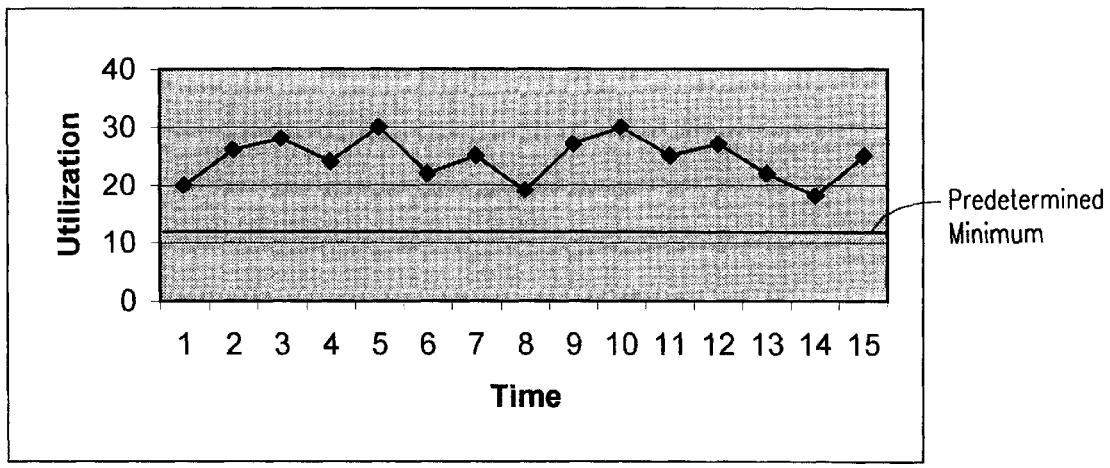
FIG. 3B illustrates an exemplary graph of memory utilization over a time interval in which memory leak is determined to exist in accordance with the second embodiment of the present invention.

FIG. 3A illustrates an exemplary graph of memory utilization over a time interval in which memory leak is determined not to exist in accordance with the second embodiment of the present invention. The threshold minimum in this case is selected to be 12 in accordance with the above-discussed principles. As the exemplary graph illustrates, samples 1, 8 and 14 fall below the threshold minimum during the predefined time interval. Consequently, this event indicates that memory leak has not occurred. In contrast, FIG. 3B illustrates an exemplary graph of memory utilization over a time interval in which memory leak is determined to exist in accordance with the second embodiment. In this case, no samples of the measured memory utilization fall below the threshold minimum during the time interval, and therefore, indicates that memory leak has occurred.

A third embodiment of the present invention enables the detection of memory leak in a shared memory unit which is experiencing an increase in mean utilization. By exploiting the fact that memory leak does not contribute to the variance of the utilization, the third embodiment is able to distinguish between increases in mean utilization caused by an increased traffic load, and increases in mean utilization caused by memory leak. For example, in a Poisson distributed process, the mean utilization is equal to the variance of the utilization. If an increase in the mean utilization is observed over a predefined time interval, the variance of the utilization should also experience a corresponding increase. If the variance of the utilization does not increase beyond a predetermined limit, then the increase in mean utilization is determined to be caused by memory leak, and not an increase in traffic load.

Accordingly, the third embodiment periodically measures memory utilization over a predefined time interval and determines a trend line of the measured utilization. This trend line may be determined, for example, by performing linear regression on the measured samples or by maintaining a running average of the measured samples over the predefined time interval. If the trend line is positively inclined and there is no increase in the standard error of the samples (e.g., the variance of the samples from the trend line) beyond a predetermined limit, then a deadlocked resource condition is determined to exist.

Figure 4A:
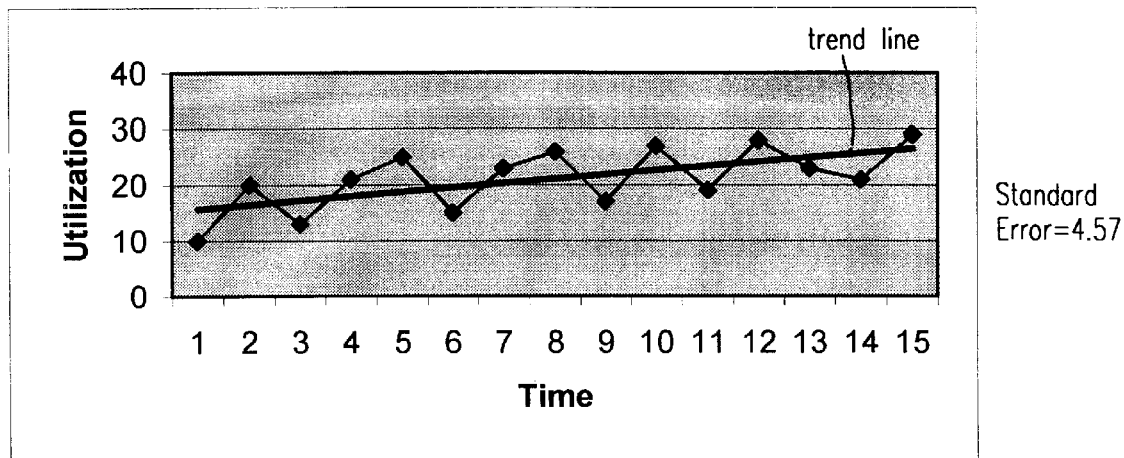
FIG. 4A illustrates an exemplary graph of memory utilization over a time interval in which memory leak is determined not to exist in accordance with a third embodiment of the present invention.
Figure 4B:
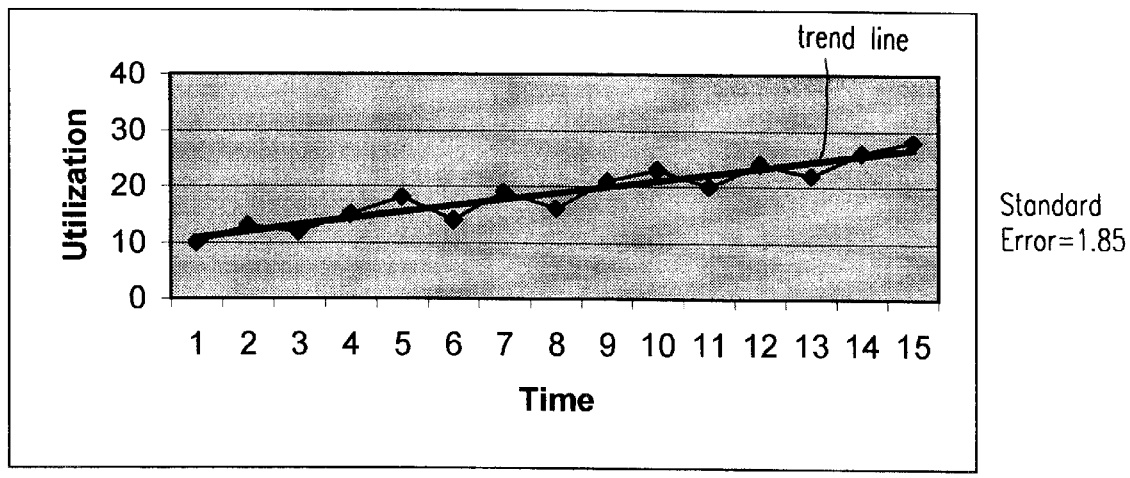
FIG. 4B illustrates an exemplary graph of memory utilization over a time interval in which memory leak is determined to exist in accordance with the third embodiment of the present invention.

FIG. 4A illustrates an exemplary graph of memory utilization over a time interval in which memory leak is determined not to exist in accordance with the third embodiment. In this example, the trend line of the sampled utilization as determined by linear regression is positively inclined, indicating either an increased traffic load or increased memory leak. The standard error of the samples is calculated to be 4.57. Assuming this calculated standard error demonstrates a sufficient increase, then memory leak is determined not to have occurred. In contrast, FIG. 4B illustrates an exemplary graph of memory utilization over a time interval in which memory leak is determined to exist in accordance with the third embodiment. In this case, the trend line is also determined using linear regression, and the standard error of the measured samples is calculated to be 1.85. Assuming the calculated standard error does not demonstrate a sufficient increase, then memory leak is determined to have occurred.

In a fourth embodiment of the present invention, memory utilization for multiple shared memory units are periodically measured over a predefined time interval. These multiple shared memory units include, for example, different shared memory units associated with a single device, shared memory units associated with different devices, or some combination of both. If memory utilization is increasing within the network, then there will tend to be a corresponding increase in memory utilization for a set of positively correlated shared memory units. These patterns of correlation between shared memory units can be determined by experience. If a particular shared memory unit demonstrates an upward trend in memory utilization during the predefined time interval (which may be determined, for example, by performing linear regression or by maintaining a running average), the trend is compared with the set of shared memory units against which the particular shared memory unit has historically been shown to be correlated. If the trend of the particular shared memory unit is greater than the average trend of the set of correlated shared memory units, then memory leak is determined to have occurred.

Figure 5A:
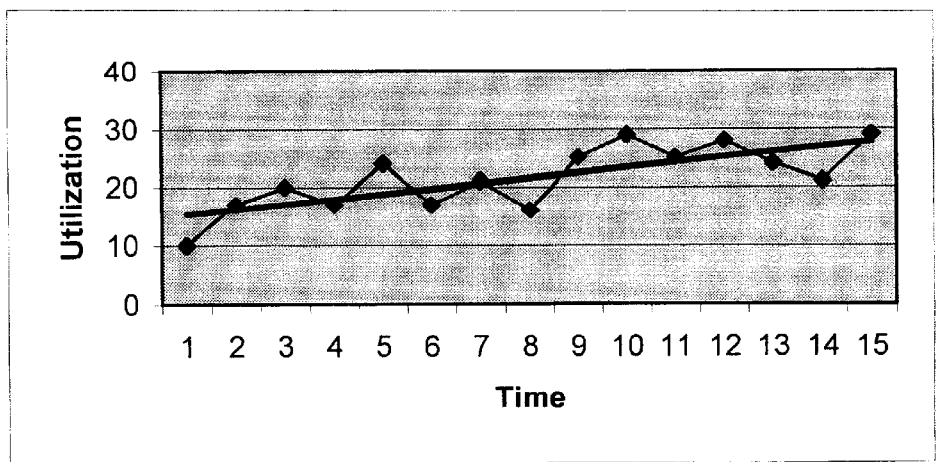
FIG. 5A illustrates an exemplary graph of average memory utilization for a set of positively correlated shared memory units.
Figure 5B:
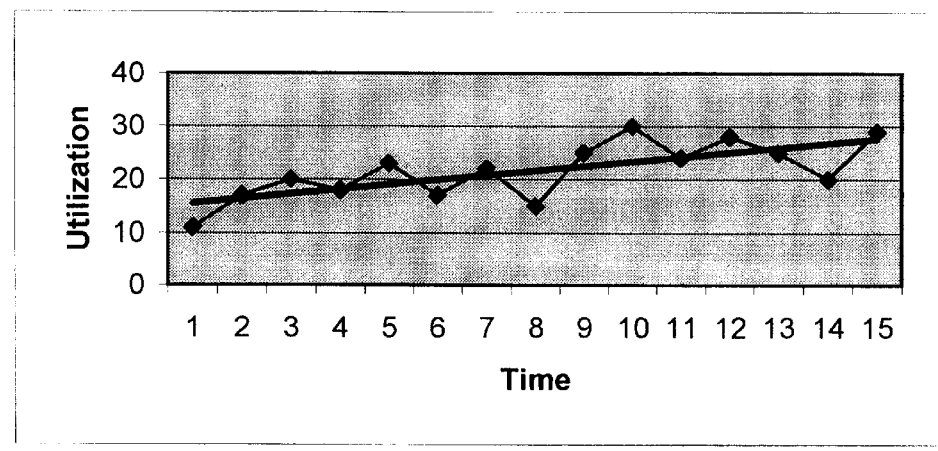
FIG. 5B illustrates an exemplary graph of memory utilization for a first shared memory unit of the set of positively correlated shared memory units in which memory leak is determined not to exist in accordance with a fourth embodiment of the present invention.
Figure 5C:
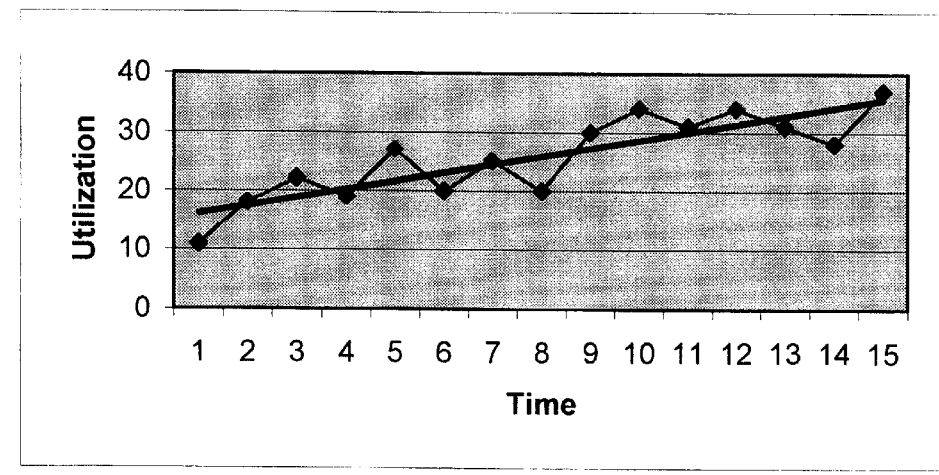
FIG. 5C illustrates an exemplary graph of memory utilization for a second shared memory unit of the set of positively correlated shared memory units in which memory leak is determined to exist in accordance with the fourth embodiment of the present invention.
Figure 6:
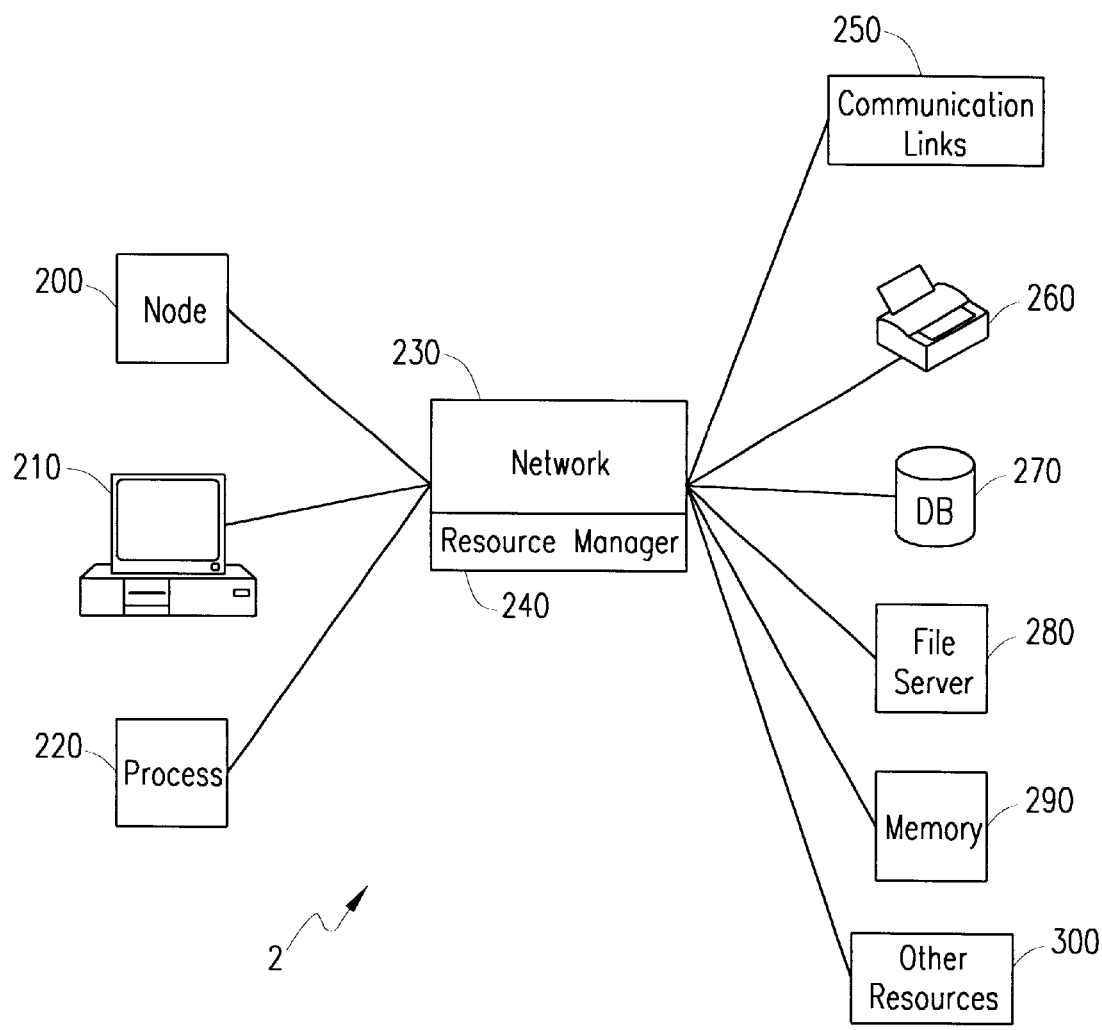
FIG. 6 illustrates a portion of an exemplary network system with which the principles of the present invention may be advantageously practiced.

FIG. 5A illustrates an exemplary graph of average resource utilization for a set of positively correlated shared memory units. The trend in this exemplary graph has a slope of 0.9, as determined by linear regression analysis. FIG. 5B illustrates an exemplary graph of resource utilization for a first shared memory unit of the set of positively correlated shared memory units in which memory leak is not determined to exist in accordance with the fourth embodiment of the present invention. As illustrated in FIG. 5B, the trend of the measured samples has a slope of 0.86, as also determined by linear regression analysis. Because the trend of the first shared memory unit is less than the trend of the set of shared memory units against which the first shared memory unit has historically been shown to be correlated, memory leak is determined not to exist. In contrast, FIG. 5C illustrates an exemplary graph of memory utilization for a second shared memory unit of the set of positively correlated shared memory units in which memory leak is determined to exist in accordance with the fourth embodiment of the present invention. The slope of the trend in FIG. 5C is determined to be 1.40 using linear regression. Accordingly, because the trend of the second shared memory unit is greater than the trend of the set of shared memory units, against which the second shared memory unit has historically been shown to be correlated, memory leak is determined to have occurred.

If any of the foregoing embodiments detect a deadlocked resource condition, the exemplary wireless system of FIG. 1 may initiate an alarm signal or notification, thereby enabling the network operator to take appropriate action, such as temporarily assigning additional resources to allow the network some ability to function, restarting the network to clear deadlocked resource conditions, and actually fixing the problem causing the deadlocked resource condition. Alternatively, the exemplary wireless system may automatically initiate system or application software that performs similar functions in response to detection of a deadlocked resource condition. For example, the exemplary wireless system may automatically initiate network diagnostic or maintenance modules that identify resources experiencing a deadlocked resource condition and that terminate the associated process or processes to free the resources. The modules may also identify the resource pools experiencing deadlocked resource conditions and at least temporarily allocate additional resources to the resource pools to allow the exemplary wireless system some ability to process calls or other events.

It should be emphasized that although the foregoing description described the present invention in the context of memory leak within a wireless communication system, the practice of the present invention is not limited to such applications or systems. Rather, it will be apparent to one of ordinary skill in the art that the teachings of the present invention are equally applicable to detection of a deadlocked resource condition in network systems in general. For example, referring to FIG. 6, a portion of an exemplary network system with which the principles of the present invention may be advantageously practiced is depicted generally at 2. This exemplary network system includes source devices or processes, such as a node 200, a computer 210, or a system or application process 220 which request access to shared resources from a network 230. The network 230 is also connected to one or more shared resources, such as communication links 250, printers 260, databases 270, file servers 280, memory 290 and other similar resources 300. It should be noted that although these shared resources 250, 260, 270, 280, 290, and 300 are illustrated as being single devices, these shared resources 250, 260, 270, 280, 290, and 300 may comprise one or more such resources grouped together as a pool of resources. A resource manager 240 within the network 230 allocates or allows access to one or more of these shared resources 250, 260, 270, 280, 290, and 300 in response to resource requests from the source devices 200, 210 and 220. Because these shared resources 250, 260, 270, 280, 290, and 300 are susceptible to problems similar to those discussed above, namely deadlocked resource conditions, the principles of the present invention may be advantageously utilized to detect a deadlocked resource condition in a pool of shared resource, and thereby allow network operators or system software to take corrective action.

Although preferred embodiment(s) of the method and system of the present invention has been illustrated in the accompanying Drawings and described in the foregoing Detailed Description, it will be understood that the present invention is not limited to the embodiment(s) disclosed, but is capable of numerous rearrangements, modifications, and substitutions without departing from the spirit and scope of the present invention as set forth and defined by the following claims.

What is claimed is:

1. A method for detecting a deadlocked resource condition in a pool of shared resources, the method comprising the steps of:

measuring at least one characteristic of resource utilization over a predefined time interval;

comparing said at least one measured characteristic in accordance with a predicted statistical relationship; and determining whether said at least one measured characteristic is inconsistent with said predicted statistical relationship at a predefined confidence level, thereby indicating that said deadlocked resource condition exists.

2. The method of claim 1, wherein said step of measuring comprises measuring a mean resource utilization and a variance of said resource utilization.

3. The method of claim 2, wherein said step of comparing comprises comparing said mean resource utilization with said variance.

4. The method of claim 2, wherein said step of comparing comprises comparing said variance to k times said mean resource utilization.

5. The method of claim 4, wherein said step of determining comprises determining whether said variance is less than k times the mean resource utilization.

6. The method of claim 5, further comprising the step of adjusting the value of k in accordance with a desired sensitivity for deadlocked resource condition detection.

7. The method of claim 1, wherein said step of measuring comprises periodically measuring a mean resource utilization and a variance of said resource utilization.

8. The method of claim 7, wherein said step of comparing comprises comparing ratios of said mean resource utilization and said variance to a predetermined value.

9. The method of claim 8, wherein said predetermined value is approximately one minus p, where p is the probability that a particular resource in said pool of shared resources is in use.

10. The method of claim 8, wherein said step of determining comprises determining whether any of said ratios fall below said predetermined value during said predefined time interval, thereby indicating that said deadlocked resource condition exists.

11. The method of claim 1, wherein said step of measuring comprises periodically sampling resource utilization over said predefined time interval.

12. The method of claim 11, wherein said step of comparing comprises comparing samples from said periodical sampling of resource utilization to a threshold minimum.

13. The method of claim 12, wherein said threshold minimum is selected from the group consisting of a predetermined value, a fraction of a mean of said samples, a fraction of a maximum of said samples, and a fraction of an historical mean resource utilization.

14. The method of claim 12, wherein said step of determining comprises determining whether any of said samples fall below said threshold minimum during said predefined time interval, thereby indicating a deadlocked resource condition.

15. The method of claim 1, wherein said step of measuring comprises measuring a resource utilization trend and a standard error of said resource utilization trend over said predefined time interval.

16. The method of claim 15, wherein said resource utilization trend is measured by performing linear regression.

17. The method of claim 15, wherein said step of comparing comprises comparing said standard error to a predetermined value.

18. The method of claim, 17, wherein said step of determining comprises determining whether said standard error is less than the predetermined value, thereby indicating that said deadlocked resource condition exists.

19. The method of claim 1, wherein said step of measuring comprises measuring a resource utilization trend over said predefined time interval.

20. The method of claim 19, further comprising measuring an average resource utilization trend over said predefined time interval for a plurality of resource pools against which said pool of shared resources has shown a positive correlation.

21. The method of claim 20, wherein said step of comparing comprises comparing said resource utilization trend to said average resource utilization trend.

22. The method of claim 21, wherein said step of determining comprises determining whether said resource utilization trend is greater than said average resource utilization trend, thereby indicating that said deadlocked resource condition exists.

23. The method of claim 1, further comprising the step of initiating a notification in response to a determination that said deadlocked resource condition exists.

24. The method of claim 1, further comprising the step of automatically initiating a diagnostic module in response to a determination that said deadlocked resource condition exists.

25. A method for detecting a deadlocked resource condition, the method comprising the steps of:
measuring a mean resource utilization and a resource utilization variance over a predefined time interval;
comparing said mean resource utilization to said resource utilization variance in accordance with a predicted statistical relationship; and
determining whether said mean resource utilization and said resource utilization variance are inconsistent with said predicted statistical relationship, thereby indicating a deadlocked resource condition.

26. The method of claim 25, wherein said step of comparing comprises comparing said resource utilization variance to k times said mean resource utilization.

27. The method of claim 26, wherein said step of determining comprises determining whether said resource utilization variance is less than k times said mean resource utilization.

28. A method for detecting a deadlocked resource condition, the method comprising the steps of:
periodically sampling resource utilization over a predefined time interval, generating a plurality of samples therefrom;
comparing each of said samples to a threshold minimum; and
determining whether none of said samples is less than said threshold minimum, thereby indicating a deadlocked resource condition.

29. The method of claim 28, wherein said step of periodically sampling comprises periodically polling a number-in-use counter.

30. The method of claim 28, wherein said predetermined time interval is greater than a mean holding time of a resource.

31. The method of claim 28, wherein said threshold minimum is selected from the group consisting of a predetermined value, a fraction of a mean of said samples, a fraction of a maximum of said samples, and a fraction of an historical mean resource utilization.

32. A method for detecting a deadlocked resource condition, the method comprising the steps of:
measuring a standard error of resource utilization over a predefined time interval;
comparing said standard error to a predetermined measurement limit; and
determining whether said standard error is less than said predetermined measurement limit, thereby indicating a deadlocked resource condition.

33. The method of claim 32, further comprising measuring a resource utilization trend.

34. The method of claim 33, wherein the method is initiated in response to said resource utilization trend being positively inclined.

35. A method for detecting a deadlocked resource condition, the method comprising:
measuring a resource utilization trend for a pool of shared resources over a predefined time interval;
measuring an average resource utilization trend for a plurality of resource pools against which said pool of shared resources has shown a positive correlation;

comparing said resource utilization trend for said pool of shared resources with said average resource utilization trend for said plurality of resource pools; and determining whether said resource utilization trend for said pool of shared resources is greater than said average resource utilization trend for said plurality of resource pools, thereby indicating a deadlocked resource condition.

36. A system for detecting a deadlocked resource condition, the system comprising:

a processing device;

a memory unit coupled to said processing device; and a plurality of instructions stored on said memory unit which when executed on said processing device cause said processing device to operate so as to:

measure at least one characteristic of resource utilization over a predefined time interval, compare said at least one measured characteristic in accordance with a predicted statistical relationship, and determine whether said at least one measured characteristic is inconsistent with said predicted statistical relationship at a predefined confidence level, thereby indicating that said deadlocked resource condition exists.

37. The system of claim 36, wherein said plurality of instructions include instructions which when executed on said processing device cause said processing device to operate so as to:

measure a mean resource utilization and a variance of said resource utilization, compare said variance to k times said mean resource utilization, and determine whether said variance is less than k times said mean resource utilization, thereby indicating that said deadlocked resource condition exists.

38. The system of claim 37, wherein said instructions further include instructions which when executed on said processing device cause said processing device to operate so as to:

adjust the value of k in accordance with a desired sensitivity for deadlocked resource condition detection.

39. The system of claim 36, wherein said plurality of instructions include instructions which when executed on said processing device cause said processing device to operate so as to:

periodically measure a mean resource utilization and a variance of said resource utilization, compare ratios of said mean resource utilization and said variance to a predetermined value, and determine whether any of said ratios fall below said predetermined value during said predefined time interval, thereby indicating that said deadlocked resource condition exists.

40. The system of claim 36, wherein said plurality of instructions include instruction which when executed on said processing device cause said processing device to operate so as to:

periodically sample resource utilization over said predefined time interval, generating a plurality of samples therefrom;

compare each of said samples to a threshold minimum; and determine whether none of said samples is less than said threshold minimum, thereby indicating that said deadlocked resource condition exists.

41. The system of claim 36, wherein said plurality of instructions include instruction which when executed on said processing device cause said processing device to operate so as to:

measure a standard error of resource utilization over said predefined time interval;

compare said standard error to a predetermined measurement limit; and determine whether said standard error is less than said predetermined measurement limit, thereby indicating that said deadlocked resource condition exists.

42. The system of claim 36, wherein said plurality of instructions include instructions which when executed by said processing device causes said processing device to operate so as to:

measure a resource utilization trend for a pool of shared resources over said predefined time interval;

measure an average resource utilization trend for a plurality of resource pools against which said pool of shared resources has shown a positive correlation;

compare said resource utilization trend for said pool of shared resources with said average resource utilization trend for said plurality of resource pools; and determine whether said resource utilization trend for said pool of shared resources is greater than said average resource utilization trend for said plurality of resource pools, thereby indicating that said deadlocked resource condition exists.

43. The system of claim 36, wherein said processing device comprises a device selected from the group consisting of a mobile switching center, a base station and a resource manager.

* * * * *